United States Patent [19]

Jones et al.

[11] 4,063,336
[45] Dec. 20, 1977

[54] CLAMP FOR TUBING

[75] Inventors: W. Richard Jones, North Barrington; Harry J. Kraig, Barrington Hills, both of Ill.

[73] Assignee: Mercury Metal Products, Schaumburg, Ill.

[21] Appl. No.: 757,068

[22] Filed: Jan. 5, 1977

Related U.S. Application Data

[63] Continuation of Ser. No. 701,908, July 1, 1976, abandoned.

[51] Int. Cl.² ............................................. F16L 33/10
[52] U.S. Cl. ......................................... 24/277; 24/279
[58] Field of Search ............ 24/277, 276, 284, 135 M; 285/199

[56] References Cited

U.S. PATENT DOCUMENTS

| Re. 28,912 | 7/1976 | Stade | 285/367 |
|---|---|---|---|
| 2,959,834 | 11/1960 | Graham | 24/277 |
| 3,772,745 | 11/1973 | Dowling | 24/277 |
| 3,879,815 | 4/1975 | Dowling | 24/277 |
| 3,955,250 | 5/1976 | Heckethorn | 24/277 |

*Primary Examiner*—Bernard A. Gelak
*Attorney, Agent, or Firm*—Silverman & Cass, Ltd.

[57] ABSTRACT

A clamp for heavy-duty use such as in clamping the telescoped tubing parts of exhaust systems of internal combustion engines. The clamp comprises a saddle portion including an arcuate pressure-applying edge adapted to engage the tubing and a conventional U-bolt that is adapted to engage the tubing diametrically opposite the pressure-applying edge of the saddle.

The clamp saddle is made up of two very similar sheet metal members that are stamped in a suitable die or dies. Each member has a pair of spaced apart semicylindrical grooves formed therein, one along each opposite end of the member, there being an integral flange extending beyond each groove. One flange is wider than the other. Two of these sheet metal members are engaged face to face and the wider flanges bent over in reversed engagement upon the narrower flange of its opposite member. One of the engaged members has a tab integral with its upper edge that is also bent over into the upper edge of the other member in reversed engagement. A strengthening rib is provided in each sheet metal member parallel to its top edge.

When assembled with the flanges and tab bent as described, the sheet metal members mate to provide a compact unitary assembled saddle having parallel passageways ways for the arms of the U-bolt. The joined assembly is robust and the two side by side arcuate edges combine to provide a stiff relatively sharp pressure-applying instrumentality that engages the tubing upon which the clamp is installed. The upper ends of the U-bolt arms are threaded as conventionally for the reception of nuts which engage the upper ends of the tubular parallel passageways. Taking up on the nuts draws the bight of the U-bolt and the pressure-applying arcuate edge of the saddle together. The pressure applied is normally sufficient to crimp and crush the tubing thereby resulting in a substantially emission-free joint.

8 Claims, 5 Drawing Figures

U.S. Patent    Dec. 20, 1977    4,063,336
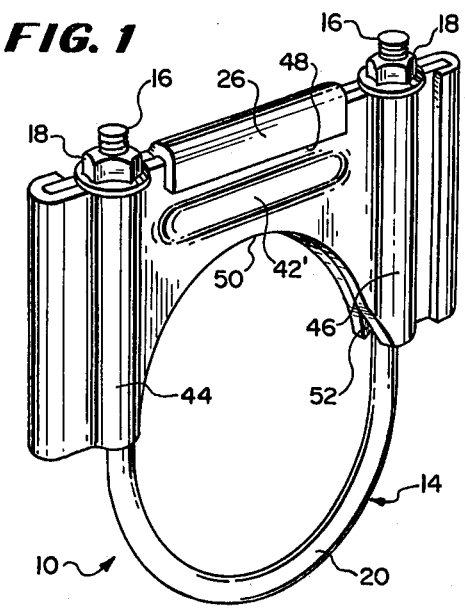
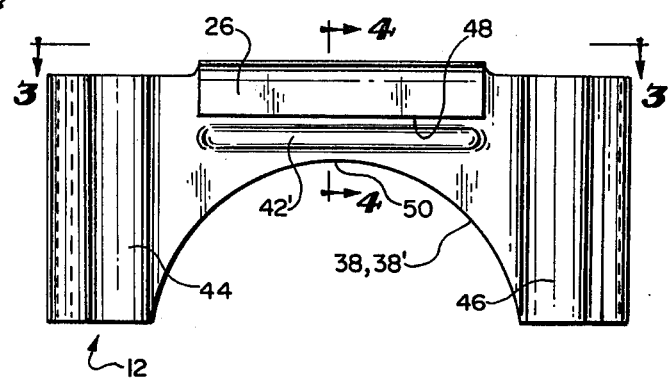
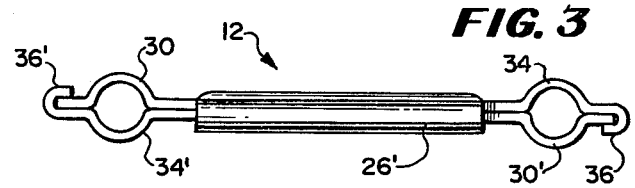
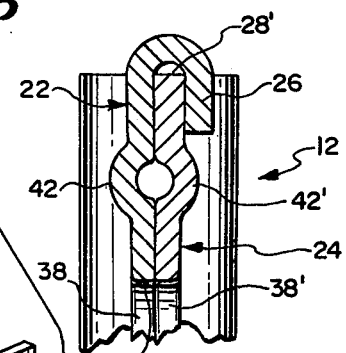
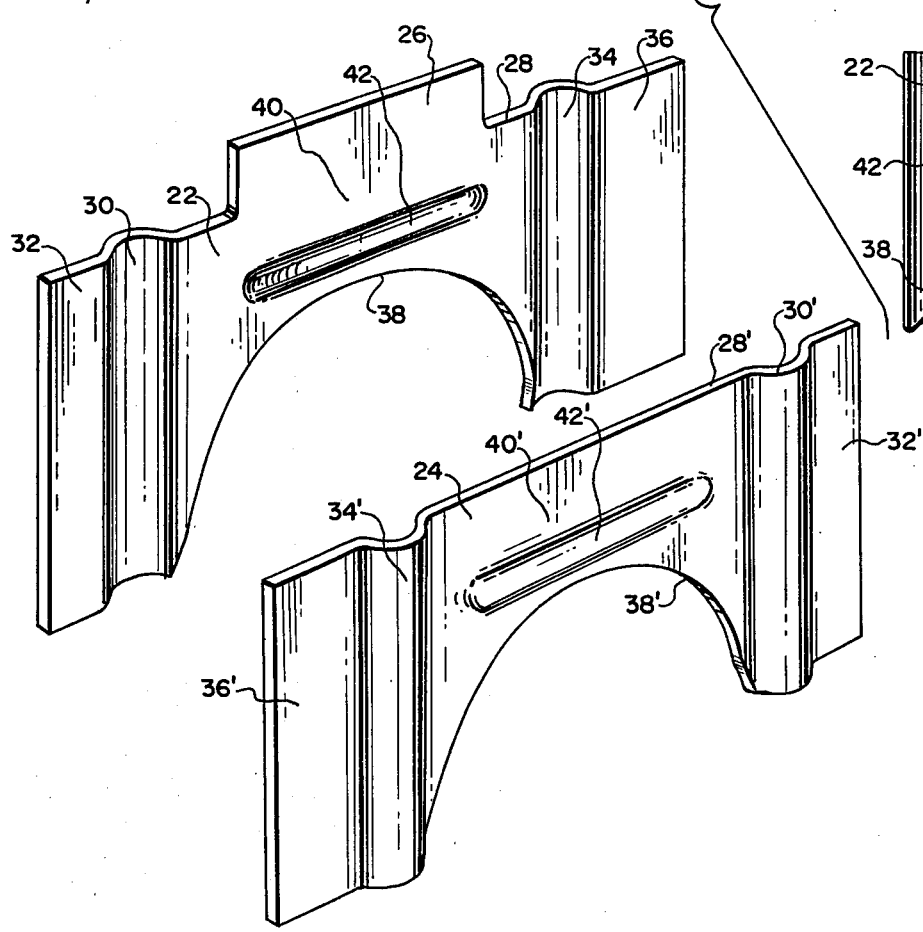

CLAMP FOR TUBING

This is a continuation of application Ser. No. 701,908, filed July 1, 1976, now abandoned.

FIELD OF THE INVENTION

The invention herein relates to a clamp for tubing but more particularly is concerned with a heavy duty type of clamp including a U-bolt which is to be used for causing an emission-free joint to be achieved between telescoping tubing of exhaust systems for internal combustion engines. The invention is directed primarily to the saddle of the clamp which is provided with a relatively sharp pressure-applying edge that is intended to achieve the joint by physically necking the telescoped tubing in a crimping action. The resulting joint is almost incapable of separation and the flow of the metal from one piece of tubing into the other practically assures a complete seal.

BACKGROUND OF THE INVENTION

The need for emission-free joints has become more urgent in recent years in the exhaust systems of internal combustion engines due to requirements of state and federal environmental agencies. Increased consciousness of public health is another factor that has made such joints more desirable to users of engines. The telescoped pipes of exhaust systems are required to be connected between the engine and the muffler or between the engine and a catalytic converter for example in such a way that there is not escape of gas from the system except where intended.

One general approach is the use of accurately engaged pipes held together with suitable clamps. This is an expensive approach and it relies upon the system being maintained in an undisturbed condition. It also depends upon the accuracy of the engaged shapes not being modified during handling and installation. U.S. Pat. No. 3,788,677 is an example of such systems and explains some of the problems.

Another approach is one in which a U-bolt clamp is used and tightened with such force that the telescoped tubing of a joint is literally crimped or crushed together due to the necking of the tubing. The invention herein is concerned with the latter approach.

The U-bolt clamps of the prior art for the most part use the same type of U-bolt, the differences being in the construction of the saddle. Various schemes have been proposed which require complex tools and dies, which require welding or other expensive processes for assembly, or which provide devices that may not withstand the great application of force needed to crush the tubing of the joint. Examples of the prior art are the following U.S. Pat. Nos.:

3,137,053 — Osborn et al
3,772,745 — Dowling et al
3,340,581 — Engman
2,959,834 — Graham The invention is characterized by the construction of a saddle made out of two sheet metal members formed by stamping, identical in all respects but for the presence of a tab along the top edge of one member. The members are reversed relative to one another, placed in a suitable die face to face and assembled by bending end flanges and the tab onto one another. No other means of attachment such as fastening devices or welding are used and yet the structure resulting is robust and effective for the purposes designed.

A rib upset in each sheet metal member and arranged transverse of the line of bending during use resists such bending moment.

SUMMARY OF THE INVENTION

A saddle for use with a U-bolt assembled thereto providing a clamp for holding telescoped tubing together comprises a pair of similar sheet metal stampings each provided with a pair of semicylindrical grooves spaced apart adjacent opposite ends and a narrow and a wide flange respectively extending beyond each groove. The top edge of one stamping has an integral tab. Each stamping has a bottom arcuate pressure-applying edge. An upset rib may be formed in each stamping to resist central bending of the assembled stampings when the clamp is in use.

The stampings are arranged face to face so that the grooves cooperate to form cylindrical tubular formations for reception of the legs of the U-bolt, the wide end flanges are bent around the backs of the adjacent narrow end flanges, the tab is bent around the top edge of the opposite stamping and the U-bolt is engaged through the tubular formations and nuts threaded to its ends to complete the assembly of the clamp.

The two bottom arcuate pressure-applying edges are congruent and together form a relatively sharp, stiff pressure-applying instrumentality that is effective to crimp or crush a tubular pipe joint when the clamp is arranged on such joint and the nuts on the ends of the U-bolt legs taken up.

The invention comprises the saddle per se as well as a combination of the saddle with a U-bolt and take-up nuts.

BRIEF DESCRIPTION OF THE DRAWING

FIG. 1 is a perspective view of a clamp for a tubing joint constructed in accordance with the invention;

FIG. 2 is a side elevational view of the saddle portion of the clamp of FIG. 1;

FIG. 3 is a top plan view of the saddle taken from the plane 3—3 of FIG. 2 and looking in the indicated direction;

FIG. 4 is a fragmentary sectional view taken through the saddle along the line 4—4 of FIG. 2 and in the indicated direction; and FIG. 5 is an exploded perspective view of the two sheet metal members which comprise the saddle, such members being shown prior to their connection to one another.

DESCRIPTION OF THE PREFERRED EMBODIMENT

The clamp of the invention is designated generally by the reference character 10 and comprises two main parts, namely the saddle 12 and the U-bolt 14. The U-bolt 14 is conventional in construction and is connected to the saddle 12 by means of its arms which pass through tubular passageways formed in the saddle and protrude from the top of the saddle 12. The upper ends of these arms are threaded as indicated at 16 and engaged by nuts 18. Taking up on the nuts 18 draws the bight 20 of the U-bolt 14 closer to the saddle 12 thereby clamping the tubular pipes of a joint (not shown) together.

The invention is concerned primarily with the construction of the saddle 12 and secondarily with the combination of the saddle with the conventional U-bolt 14 as a clamp assembly. The saddle 12 is readily manufactured and sold by itself to users who can obtain the conventional U-bolt and nuts from many other sources.

The saddle 12 is formed of two almost identical sheet metal members 22 and 24 which are easily stamped in the same die. The only difference between these sheet metal members 22 and 24 is that the sheet metal member 22 has an elongate rectangular tab 26 integral with its upper edge 28. The stampings shown in FIG. 5 may be made identically initially, being both the same as the sheet metal member 22. Thereafter the tab 26 of half of the members may be cut off in a simple die to provide the sheet metal member 24. As one alternate process, there may be two independent dies each stamping one of the sheet metal members 22 and 24. In this way, the sheet metal member 24 may be formed of strip stock narrower than the member 22. Still another plan is to have a die with an insert for stamping the tab 26. The die is set up for stamping sheet metal members 22 of narrow strip without the insert. When it is desired to stamp the sheet metal members 24, the insert is secured in place and the wider strip run through the die to form the sheet metal members 24.

The sheet metal member 22 has a semi-cylindrical groove 30 formed at its left end and a narrow integral flange 32 extending beyond the groove. At its right hand end the member 22 has an identical parallel grove 34 with a flange 36 extending beyond said groove 34, the width of the flange 36 being greater than the width of the flange 32. The lower part of the sheet metal member 22 is cut in a semicircular arc which provides a pressure-applying edge 38 that is of a radius to closely match the outer diameter of the tubing to which the clamp 10 is to be mounted. Likewise the radius of curvature of the bight 20 of the U-bolt to be used with the saddle 12 will be the same or quite close in dimension to that of the pressure-applying edge 38.

As the clamp 10 is used, there will be a bending moment tending to apply a force across the bridging section 40 of the saddle 12. A rib 42 is formed in the sheet metal member 22 which extends across the line of bending for resisting the same.

The sheet metal member 24 is identical in every respect to the sheet metal member 22 except for the fact that the tab 26 is absent. On this account the identical reference characters are used for the same parts except that they are primed for the member 24.

In assembling the two sheet metal members 22 and 24 to form the saddle 12, it is convenient to place them face to face in a die and bend the two flanges 36 and 36' in a reverse bent engagement over, around and upon the respective flanges 32 and 32'. At the same time the tab 26 is bent in a reverse bent engagement over and around the top edge 28' and into engagement with the outside surface of the member 24.

The resulting saddle 12 is an integral, strong article. There are no rivets, bolts or welds keeping it in assembly. The grooves 30 and 34' and 30' and 34 cooperate to form cylindrical tubular passageways which are designated 44 and 46. The two ribs 42 and 42' are upset in a direction such that when they face one another they provide a generally hollow cylindrical formation at a critical point in the saddle 12 where bending is resisted.

In the construction of the clamp 10, the formation provided by the ribs 42 and 42' is arranged to be located about half way between the bottom edge 48 of the bent-over tab 26 and the uppermost point 50 of the pressure applying edges 38, 38'. The clamp 10 illustrated in the drawing is of such construction that the edges 38, 38' intersect the tubular passageways 44 and 46 partially thereby producing a slight spread formation on each side of the saddle as indicated at 52. The formations 52 are not essential but are the result of the geometry of the structure. The pressure-applying edges 38, 38' are desirably as close to a semicircle as possible and as closely as possible a continuation of the interior pressure applying edge of the bight 20 of the U-bolt 14.

The embodiments of the invention may take various forms without departing from the spirit or scope as defined in the appended claims.

What it is desired to secure by Letters Patent of the United States is:

1. A U-bolt clamp saddle comprising:
    an assembly of two sheet metal members face to face, each member being formed of a generally rectangular stamping having a vertically arranged semicylindrical groove adjacent respective ends, an integral flange extending beyond each end and one flange extending further than the other to form a narrow flange at one end and a wide flange at the other end, a semicircular pressure-applying edge formed at the bottom of each sheet metal member and extending from the bottom end of one groove to the bottom end of the other groove, one of the sheet metal members having an integral tab formed on its top edge spaced above the center of the semicircular edge, the assembly being effected with the wide flanges reverse bent over and around the juxtaposed narrow flanges and the tab reverse bent over and around the upper edge of the second sheet metal member.

2. A clamp saddle as claimed in claim 1 further including:
    a strengthening rib formed in each member between said semicylindrical grooves and substantially transverse to said grooves.

3. A clamp saddle as claimed in claim 2 wherein:
    said strengthening ribs are formed substantially, normal to said grooves, for a substantial length of the distance between said grooves, approximately centered between said grooves and substantially half way between the top of said pressure-applying edge and the bent over end of said tab.

4. A clamp assembly comprising:
    a saddle of two sheet metal members face to face, each member being formed of a generally rectangular stamping having a vertically arranged semicylindrical groove adjacent respective ends, an integral flange extending beyond each end and one flange extending further than the other to form a narrow flange at one end and a wide flange at the other end, a semicircular pressure-applying edge formed at the bottom of each sheet metal member and extending from the bottom end of one groove to the bottom end of the other groove, one of the sheet metal members having an integral tab formed on its top edge spaced above the center of the semicircular edge, the saddle assembly being effected with the wide flanges reverse bent over and around the juxtaposed narrow flanges and the tab reverse bent over and around the upper edge of the second sheet metal member, with the opposing grooves aligned with one another to form parallel passageways, and a U-bolt with its arms passing through said passageways, each arm having a threaded end and a nut engaged on each threaded end, the bight of the bolt extending below said saddle opposite said semi-circular pressure-applying edge, said clamp adapted to clamp at least one tubular member between said bight and said semicircular pressure-applying edge when said nuts are tightened against the top of said saddle.

5. A clamp assembly as claimed in claim 4 further including:

a strengthening rib formed in each member between said semicylindrical grooves and substantially transverse to said grooves.

6. A clamp assembly as claimed in claim 5 wherein:

said strengthening ribs are formed substantially, normal to said grooves, for a substantial length of the distance between said grooves, approximately centered between said grooves and substantially half way between the top of said pressure-applying edge and the bent over end of said tab.

7. A U-bolt clamp saddle comprising:

an assembly of two sheet metal members face to face, each member being formed of a generally rectangular stamping having a vertically arranged semicylindrical groove adjacent respective ends, an integral flange extending beyond each end and the pair of flanges at each pair of common ends comprising one extending beyond the other to provide a narrow and a wide flange juxtaposed relative to and engaging one another, a semicircular pressure applying edge formed at the bottom of each sheet metal member and extending from the bottom end of one groove to the bottom end of the other groove, one of the sheet metal members having an integral tab formed on its top edge space above the center of the semicircular edge, the assembly being effected with the wide flanges reverse bent over and around the juxtaposed narrow flanges and the tab reverse bent over and around the upper edge of the second sheet metal member.

8. A clamp saddle as claimed in claim 7 further including:

a strengthening rib formed in each member between said semicylindrical grooves, said strengthening ribs formed substantially, normal to said grooves, for a substantial length of the distance between said grooves, approximately centered between said grooves and substantially half way between the top of said pressure-applying edge and the bent over end of said tab.

* * * * *